Dec. 2, 1941.    J. D. KAHL    2,264,848
AIR-CONDITIONING APPARATUS FOR CLOSED AUTOMOBILES
Filed Sept. 5, 1939
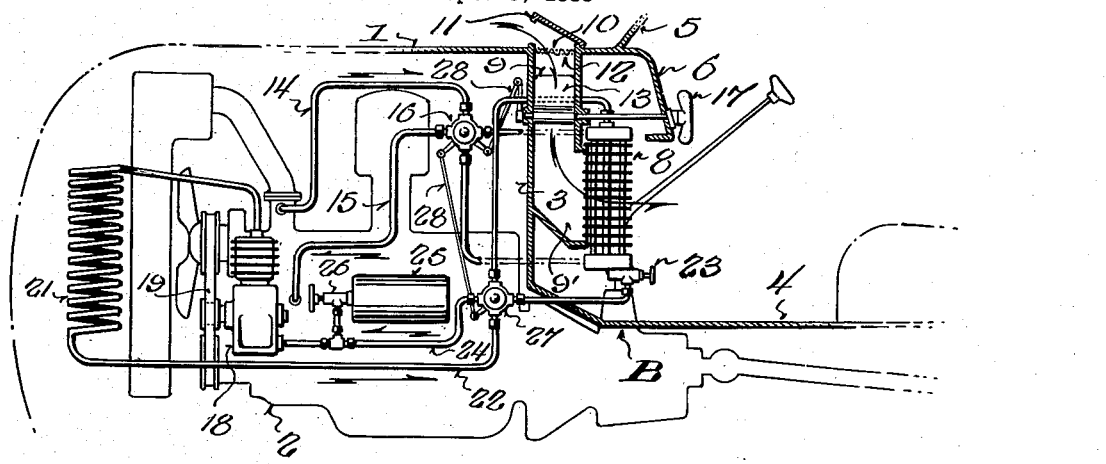
Fig. 1.
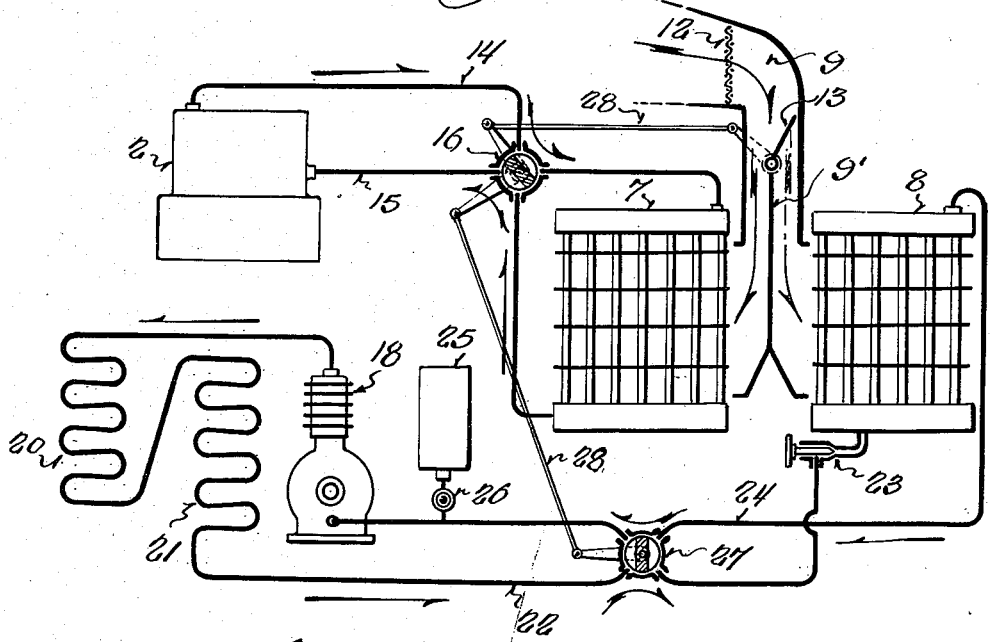
Fig. 2.
Inventor
Joseph D. Kahl.
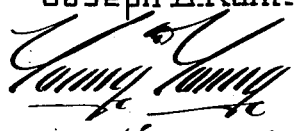
Attorneys Patented Dec. 2, 1941

2,264,848

UNITED STATES PATENT OFFICE 2,264,848

AIR-CONDITIONING APPARATUS FOR CLOSED AUTOMOBILES

Joseph D. Kahl, Ripon, Wis.

Application September 5, 1939, Serial No. 293,453

1 Claim. (Cl. 257—7)

This invention pertains to air-conditioning apparatus for closed motor vehicles, and more particularly to a system for selectively supplying cleaned, heated, or cooled air to the closed cab of a motor-driven passenger vehicle.

The invention has primarily for its object to provide a comparatively simple, inexpensive, and effective apparatus in which outside filtered air is selectively directed through suitable radiator cores positioned within the vehicle, one of which is cooled by a mechanical refrigerating apparatus, while the other is heated by circulation of the vehicle motor-cooling liquid.

Incidental to the foregoing, a more specific object of the invention resides in the provision of manually actuated means for simultaneously effecting operation of the radiator cores in coordination with the selective direction of filtered air through the cores.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing:

Figure 1 is a diagrammatic view of an apparatus constructed in accordance with one form of the invention, the same being shown as applied to a motor-driven vehicle; and Figure 2 is a schematic showing of the apparatus to more clearly illustrate the arrangement of the various elements.

Referring now more particularly to the accompanying drawing, Figure 1 is a fragmentary section through a conventional automobile body designated as B, and comprising a hood 1 for the motor 2, shown in light lines. Extending downwardly from the hood is a dash 3, which connects with the floor 4 of the vehicle. The body has the usual windshield 5 extending upwardly from the cowl or panel-board 6 disposed within the vehicle.

Mounted within the vehicle, in any desired location, preferably below the panel-board and adjacent the dash 3, is a pair of radiator cores 7 and 8 which serve as heating and cooling elements, respectively, for outside air admitted to the interior of the body through a duct 9, having an opening 10 communicating with the outside of the vehicle, and controlled by a hinge cover 11. Mounted within the opening 10 is a screen or filter 12 of any conventional type.

As best indicated in Figure 1, the duct 9 is divided by a vertical partition 9', provided at its upper end with a gate valve 13, which selectively directs air entering the duct to one or the other cores 7 and 8.

As best shown in Figure 2, the heating radiator 7 is connected with the water-jacket or cooling system of the motor 2 through the feed line 14 and return line 15, both lines communicating with a two-way valve 16 to cut off or admit circulated heated water from the motor to the core 7, when it is desired to heat the car, in which instance the gate valve 13 is manually set at the position shown in Figure 2, by means of a handle 17 carried by the panel 6, to direct filtered air between the tubes or coils of the core 7, and into the car.

To supply refrigeration or cooling fluid to the core 8, a more or less conventional mechanical refrigerating system is employed, which comprises a compressor 18, which may be driven by the fan belt 19 of the motor, or by any desired operative connection with the motor 2. In operation, the compressor delivers the fluid refrigerant to the condenser coil 20 in the form of high-pressure gas, and inasmuch as the coil 20 is preferably positioned in front of the radiator of the vehicle engine, as shown in Figure 1, the gas passing through the same is cooled by the inrush of air, after which it passes into the coil 21, also positioned in the front of the radiator, where it is further cooled, and converted into a high-pressure liquid.

From the coil 21, the refrigerant passes through a feed line 22 to the radiator core 8, which is controlled by an expansion valve 23. Naturally, as the high-pressure liquid refrigerant passes through the expansion valve 23, the throttling action reduces the pressure, causing the same to progressively expand and return to a gas, during which action heat is adsorbed from the core 8, and air passing through the same is cooled. From the core 8, the gas is returned to the compressor through a return line 24.

Any desired refrigerant, such as methyl, ammonia, sulphur, Freon, or the like, may be employed, and for the purpose of replenishing the system, as a result of gas leakage or deterioration, an additional supply of refrigerant may be introduced into the return line 24 from a supply tank 25 controlled by the valve 26.

Like the heating circuit, the feed and return lines 22 and 24, respectively, communicate with a control valve 27, by means of which communication between the compressor and condenser coils, and the expansion core may be opened or cut off, as desired.

As previously explained, when the valve 16 is set to provide communication between the heating core 7 and the motor cooling system, the valve 27 controlling the cooling core 8 is closed, while the gate valve 13 is set to direct air entering the duct 9 between the tubes of the core 7 to heat the interior of the car. When it is desired to cool the car, the valve 16 is closed and the valve 27 opened, at which time the gate valve 13 is shifted to direct air through the core 8.

While the several control valves may be independently manipulated, for greater convenience they may be connected by links 28, whereby manual actuation of the gate valve will simultaneously actuate the valves 16 and 27 to effect desired control of the heating and cooling cores.

From the foregoing explanation, considered in connection with the accompanying drawing, it will be readily seen that an air-conditioning apparatus has been provided for motor-driven passenger vehicles, by which outside filtered air may be introduced into the vehicle body through either a heating or cooling core, the heating core being supplied by the motor cooling system, while the cooling core is serviced by a typical mechanical refrigeration system actuated through operative connection with the motor. It will also be noted that operation of the apparatus is materially facilitated through connection of the various controls for their simultaneous coordination with each other to bring about the desired action of the apparatus.

I claim:

In an air-conditioned apparatus for motor vehicle bodies, spaced cooling and heating radiator cores, a fluid supply line connected with each of said cores, a control valve in each of said supply lines, an air duct communicating with said cores and the exterior of said vehicle body, and a manually controlled gate valve in said duct for selectively directing air against one or the other of said cores, said gate valve and control valves being operatively connected for simultaneous operation, whereby the fluid supply line to the core against which air is directed from said duct is opened.

JOSEPH D. KAHL.